(12) United States Patent
Frank et al.

(10) Patent No.: US 7,795,764 B2
(45) Date of Patent: Sep. 14, 2010

(54) MACHINE HAVING AN UNCOOLED ROTOR BODY AND A COOLED ROTOR WINDING, AS WELL AS AN ASSOCIATED HOLDING AND/OR SUPPORTING DEVICE

(75) Inventors: Michael Frank, Uttenreuth (DE); Peter Van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 87 days.

(21) Appl. No.: 12/304,395

(22) PCT Filed: May 4, 2007

(86) PCT No.: PCT/EP2007/054351

§ 371 (c)(1),
(2), (4) Date: Dec. 11, 2008

(87) PCT Pub. No.: WO2007/144231

PCT Pub. Date: Dec. 21, 2007

(65) Prior Publication Data

US 2009/0267425 A1 Oct. 29, 2009

(30) Foreign Application Priority Data

Jun. 12, 2006 (DE) .................. 10 2006 027 219

(51) Int. Cl.
*H02K 9/00* (2006.01)
(52) U.S. Cl. .......................... 310/52; 310/54
(58) Field of Classification Search ........... 310/52–59
See application file for complete search history.

(56) References Cited

U.S. PATENT DOCUMENTS

| 6,608,409 B2 * | 8/2003 | Wang et al. | 310/54 |
| 6,617,714 B2 * | 9/2003 | Laskaris | 310/54 |
| 6,700,274 B2 * | 3/2004 | Gamble et al. | 310/179 |
| 6,794,792 B2 * | 9/2004 | Wang | 310/270 |
| 6,795,720 B2 * | 9/2004 | Wang | 505/166 |
| 6,815,860 B2 * | 11/2004 | Wang et al. | 310/214 |
| 7,061,147 B2 * | 6/2006 | Ries | 310/54 |
| 7,075,208 B2 * | 7/2006 | Frank et al. | 310/270 |
| 7,547,999 B2 * | 6/2009 | Laskaris et al. | 310/52 |
| 7,633,192 B2 * | 12/2009 | Zhang et al. | 310/52 |

FOREIGN PATENT DOCUMENTS

| CN | 2596298 Y | 12/2003 |
| DE | 695 01 099 T2 | 6/1998 |
| DE | 199 43 783 A1 | 3/2001 |
| DE | 103 03 307 A1 | 8/2004 |
| DE | 10 2004 039 855 A1 | 3/2006 |
| EP | 1 366 559 B1 | 7/2007 |
| GB | 1 361 426 A | 7/1974 |
| JP | 07 222431 A | 8/1995 |
| WO | WO 98/02053 A1 | 1/1998 |
| WO | WO 01/59909 A1 | 8/2001 |
| WO | WO 2004/068682 A1 | 8/2004 |

\* cited by examiner

*Primary Examiner*—Thanh Lam
(74) *Attorney, Agent, or Firm*—Henry M. Feiereisen; Ursula B. Day

(57) ABSTRACT

The invention relates to a machine with an uncooled rotor, which is mounted such that it is capable of rotating about an axis of rotation and which has cutouts or flattened portions on its outside. At least one rotor winding, which is accommodated in a cryostat with a cryostat wall and is to be cooled to low temperature, should be arranged in the cross-sectional area region of these flattened portions. A holding and/or support device is used for transmitting forces acting on the rotor winding beyond the cryostat wall to the rotor body. In order to reduce losses in the cooling system which occur as a result of thermal conduction, the holding and/or support device should contain at least one support element, which is equipped with means for reducing the thermal conductivity.

13 Claims, 3 Drawing Sheets

MACHINE HAVING AN UNCOOLED ROTOR BODY AND A COOLED ROTOR WINDING, AS WELL AS AN ASSOCIATED HOLDING AND/OR SUPPORTING DEVICE

BACKGROUND OF THE INVENTION

The invention relates to a machine having a rotor which is mounted such that it can rotate about a rotation axis and
comprises an uncooled rotor body which, on an outside, has recesses or flats, in the cross-sectional surface area of which at least one rotor winding is arranged, which is accommodated in a cryostat with a cryostat wall and can be cooled to low temperature, and
is provided with a holding and/or supporting device for transmission of forces acting on the rotor winding via the cryostat wall to the rotor body, wherein
the holding and/or supporting device contains at least one supporting element via which heat is transmitted from the rotor body to the rotor winding.

A corresponding machine is known from DE 10 2004 039 855 A1.

In the case of rotating machines with a rotor winding which is cooled to low temperature below 80 K, in particular a superconducting rotor winding, the torque is partially incurred on the cold windings of the rotor. In order to allow it to be utilized, the applied torque must be transmitted to a hot shaft. An apparatus that is suitable for this purpose must on the one hand be able to transmit the torque, which in large machines may be several 100 kNm, while on the other hand the holding apparatus for the superconducting rotor windings must provide good thermal insulation. Only if the thermal insulation is good enough is it possible to keep the rotor windings at the low temperature required for superconduction, with a limited amount of cooling.

In the case of machines known from the prior art, the superconducting rotor windings are held by a winding mount which is in turn located on a central mount core. One such arrangement is known from DE 199 43 783 A1. The rotor windings, winding mount and mount core in a machine such as this are at a low temperature, as required for superconduction. The large mass of the cold mount structure in machines of this type result in very long cooling-down times, and the need to use powerful cooling systems. A further machine of this type is disclosed in WO 98/02053.

Because of the technical problems mentioned above, it is advantageous for large machines for at least a part of the mount structure of the rotor windings not to be cooled down to the low temperatures required for superconduction, that is to say to use an at least partially warm mount structure. A machine of this type is disclosed, for example, in DE 10 2004 039 855. In the case of machines of this type, the superconducting rotor winding is located in a cryostat, which is located on the outside of the uncooled rotor body, in a corresponding recess or on a corresponding flat. In the case of machines such as these, with a so-called warm mount structure, it is necessary to attach the superconducting rotor windings, which have been cooled to low temperatures, to the warm rotor body by means of a suitable holding and/or supporting apparatus. One such holding and/or supporting apparatus is known from DE 103 03 307 A1.

In the case of the machines known from the prior art, losses take place by thermal conduction from the superconducting rotor windings, which are at low temperatures, via the various parts of a holding and/or supporting apparatus. Appropriate cooling power must be supplied via the cooling system into these areas of the machine in order to maintain the low temperatures, as required for superconduction, in the area of the rotor windings.

SUMMARY OF THE INVENTION

The object of the present invention is to improve the holding and/or supporting apparatus of the superconducting rotor windings of a machine of the type mentioned initially such that the losses resulting from thermal conduction from the cold superconducting rotor windings to the uncooled rotor body can be reduced.

According to the invention, this object is achieved by a machine intended to be provided with a rotor which is mounted such that it can rotate about a rotation axis and has an uncooled rotor body which, on the outside, has recesses or flats, in whose cross-sectional surface area the rotor windings to be cooled are accommodated in a cryostat and whose rotor furthermore has a holding and/or support device for transmission of forces, acting on the rotor winding, via the cryostat wall to the rotor body. The holding and/or support device is also intended to contain at least one support element via which heat is transmitted from the rotor body to the rotor winding. According to the invention, the at least one support element is intended to be equipped with means to reduce the thermal conductivity, which means fill at least a part of a cross-sectional surface at right angles to the heat transmission direction.

The measures according to the invention reduce losses resulting from thermal conduction from the cold rotor windings to the warm rotor body.

The measures according to the invention result in the advantage that the cooling system of the machine can be designed to be smaller. Minimizing cooling losses caused by thermal conduction therefore has a positive effect on the efficiency of the machine.

Advantageous refinements of the machine according to the invention are specified in the dependent claims. In this case, the embodiment as claimed in claim 1 can be combined with the features of one of the dependent claims or preferably also with those of a plurality of dependent claims. The machine according to the invention can accordingly advantageously also have the following features:

the support element can thus be fitted between the rotor winding and the cryostat wall, or between the cryostat wall and the rotor body. This measure according to the invention makes it possible to selectively reduce the heat loss between the rotor winding and the cryostat wall or on the other hand the heat loss between the cryostat wall and the rotor body.

The holding and/or support device of the machine may also contain a plurality of support elements, at least one support element of which is fitted between the rotor winding and the cryostat wall and at least one further support element is fitted between the cryostat wall and the rotor body. A design such as this allows a two-stage cooling system to be provided in which, preferably, the cryostat wall is at a temperature which is between the temperature of the cold rotor windings and the temperature of the rotor body. This allows the thermal conduction losses to be further minimized.

As means for reducing the thermal conductivity, the support elements may have a layer structure which is oriented essentially at right angles to the heat transmission direction. The thermal resistances provided by the layer structure make it possible to further reduce the thermal conductivity of the support element in the direction of the heat transmission direction. A layer structure such as this composed of poorly thermally conductive material and thermal resistances incorporated therein makes it possible to further reduce the thermal conductivity in comparison to an implementation of the support element as a solid element composed of poorly thermally conductive material.

The layer structure of the support element can also be designed such that the support element is produced from individual parts which are joined together to form thermal resistances. This results in further thermal resistances being formed at the boundary surfaces which are created between the individual parts.

Furthermore, the individual parts of the support element may preferably be composed of a glass-fiber-reinforced plastic. Glass-fiber-reinforced plastic advantageously has not only high strength but also low thermal conductivity.

The support element may be in the form of a component composed of glass-fiber-reinforced plastic and may have a layer structure which is created by the layer of glass fibers in the plastic. This advantageously results in the method of operation as described above of thermal resistances by virtue of the microscopic structure of the glass-fiber-reinforced plastic. Thermal resistances are therefore created on the individual glass fiber layers.

Furthermore, the support element may be manufactured from a porous material which is preferably a sintered material. This results in thermal resistances being created by the cavities which exist in the porous material, instead of a layer structure of the component, as mentioned above.

The support element is also designed such that it is essentially suitable for withstanding pressure loads.

The rotor winding of the machine may be manufactured from a superconducting material. The use of superconductors as a material for the rotor windings allows the machine to have a more compact physical form than when using normally conductive rotor windings.

HTC material may be used as the superconducting material. An HTC material should be understood as meaning a superconducting material with a high critical temperature (high $T_c$ material). The critical temperature is typically above the boiling point of nitrogen. The use of high-temperature superconductors therefore makes it possible to use nitrogen as a coolant, which is cost-effective and highly available.

Furthermore, LTC material may be used as the superconducting material. The expression LTC material should be understood as meaning a material for low-temperature superconductors (low $T_c$ superconductors). These materials have already been technically tested for longer than HTC material, and can thus be handled well.

Further advantageous refinements of the machine according to the invention will become evident from the dependent claims not referred to above, and from the drawings.

BRIEF DESCRIPTION OF THE DRAWING

The invention will be explained in more detail in the following text with reference to the drawings in which preferred embodiments of the machine according to the invention or of parts thereof are illustrated schematically. In this case

DETAILED DESCRIPTION OF PREFERRED EMBODIMENTS

The corresponding parts in the figures are each provided with the same reference symbols.

Figure 1:
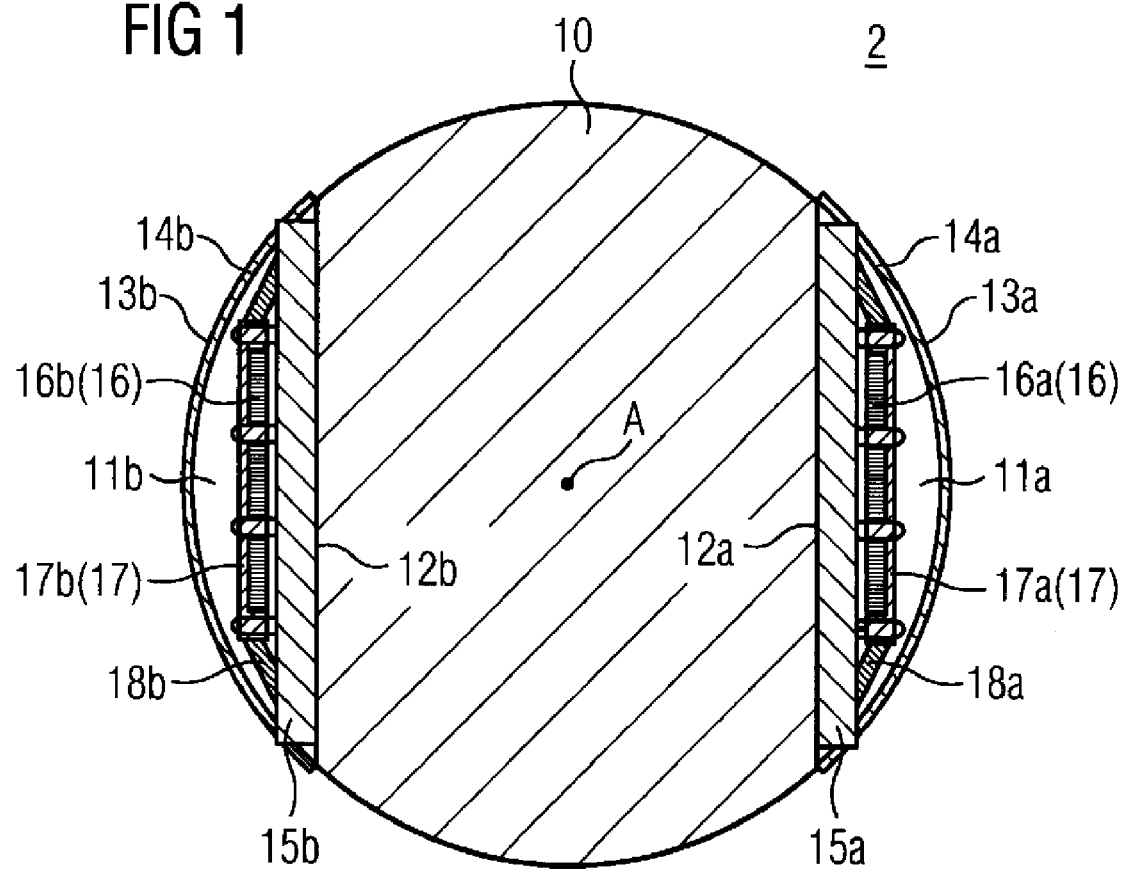
FIG. 1 shows a cross section through a rotor element according to the prior art.

FIG. 1 shows a rotor 2, indicated in the form of a cross section, of a machine as is known from DE 10 2004 039 855 A1. 10 denotes an uncooled rotor body which is mounted such that it can rotate about an axis A and can preferably be produced from a ferromagnetic material, in particular such as iron. On its outside, the rotor body 10 has opposite recesses or flats 11a, 11b. Seen in cross section, these recesses or flats may be like circle segments and extend axially, that is to say parallel to the axis A of the rotor body. The recesses can likewise be formed with shapes other than those mentioned here. Base plates 12a, 12b are fitted to the rotor body 10 on the side of the recesses or flats facing the rotation axis and, seen in cross section, extend along circle cords or secants. Wall parts annotated 14a, 14b complete the circle segment, seen in cross section. Together with the base plates 12a, 12b, they form a cryostat 13a, 13b. At least parts of a rotor winding 16a, 16b of a field winding, which is annotated 16 in general, are located within the cryostat 13a, 13b. The rotor windings 16a, 16b may be of the race track type and, in particular, may be composed of a plurality of assembled parts. In particular, the rotor windings 16a, 16b of the field winding 16 can be produced from superconducting material. In particular, YBCO may be used as a superconducting material. When using YBCO or BPSCCO as a superconducting material, the rotor windings 16a, 16b may be brought to the temperature required for superconduction when using liquid nitrogen, helium or neon as a coolant. Furthermore, the rotor windings 16a, 16b may be fitted in the cryostat 13a or 13b by rail-like or groove-like holding elements 17a, 17b of a holding and/or supporting device which is annotated 17 in general. The holding and/or supporting device 17 may in particular contain supporting elements 18a, 18b for absorbing compressive and/or tensile forces.

Figure 2:
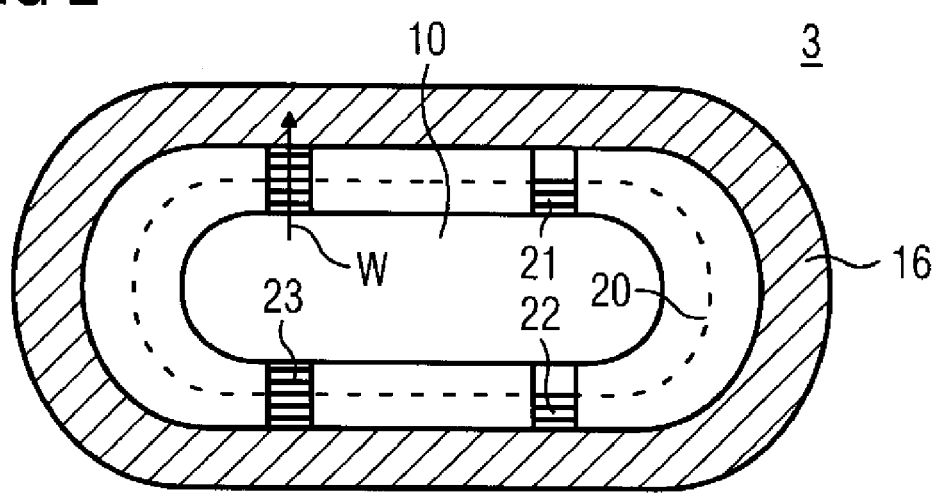
FIG. 2 shows one preferred embodiment of a holding and/or supporting apparatus which contains at least one supporting element according to the invention.

FIG. 2 shows a part, annotated 3 in general, of a machine in which a rotor winding 16a, 16b is connected to a warm rotor body 10 via a plurality of supporting elements 21 to 23. In particular, the rotor winding 16a, 16b may be of the race track type and may be manufactured at least partially from superconducting material. The rotor winding 16a, 16b is located within a cryostat as shown in FIG. 1, whose cryostat wall 20 is typically located between the warm rotor core 10 and the rotor winding 16a, 16b. A supporting element 21, 22 according to the invention can now optionally be located between the warm rotor core 10 and the cryostat wall 20, or between the cryostat wall 20 and the cold rotor winding 16.

According to the invention, the supporting elements 21 to 23 are equipped with measures to reduce the heat flow W from the warm rotor core 10 to the cold rotor winding 16a, 16b. These measures will be considered in more detail in conjunction with FIGS. 3 to 5. Furthermore, a supporting element may be designed such that it connects the cold rotor winding 16a, 16b to the warm rotor core 10 via the cryostat wall 20. An embodiment such as this is illustrated, annotated 23, in FIG. 2. In this case, the supporting element 23 may be formed from two parts. A first part connects the rotor winding 16 and the cryostat wall 20, and a second part connects the cryostat wall 20 and the rotor core 10 to one another. Alternatively the supporting element 23 may be formed from a single part, which component directly connects the cold rotor winding 16 to the warm rotor core 10. The options for use of the supporting elements 21 to 23 according to the invention are not restricted to the embodiment 2 indicated in FIG. 2. Widely differing geometries are possible between the rotor winding 16, the cryostat wall 20 and the rotor core 10. It is likewise possible to use a different number of supporting elements 21 to 23. In particular, it is also possible for the cryostat wall to rest directly on the core 10, or even to be formed by it.

Figure 3:
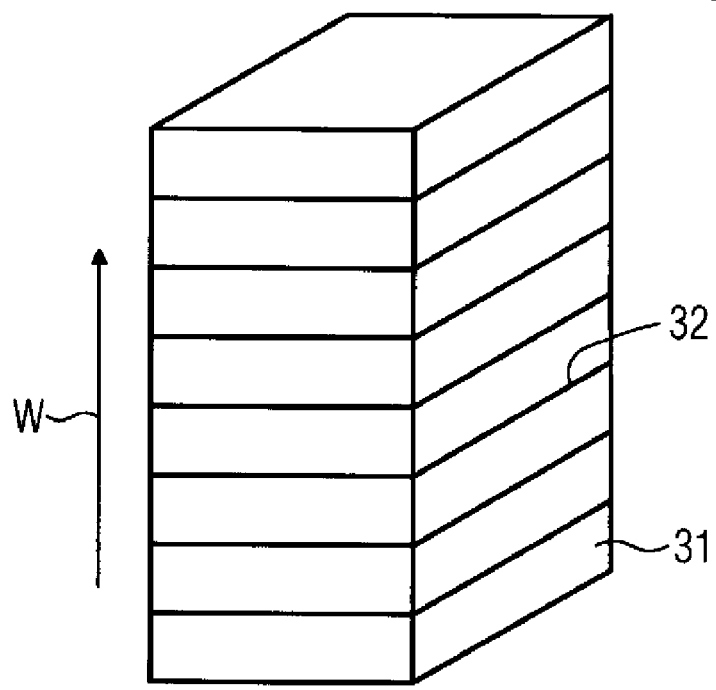
FIG. 3 to 5 show preferred embodiments of the supporting element according to the invention.

FIG. 3 shows an embodiment, which is illustrated schematically and is annotated 4 in general, of a supporting element according to the invention. In this case, the supporting element 4 has a layer structure which is oriented essentially at right angles to the direction of the heat flow W. The supporting element 4 is manufactured from a poorly thermally conductive material, for example from a glass-fiber-reinforced plastic. The glass-fiber-reinforced plastic comprises a matrix 31 and layers 32 embedded in this matrix 31. The matrix 31 may be represented by a synthetic or cast resin, and the embedded layers 32 may be composed of glass fibers. According to the invention, the embedded glass fibers form thermal resistances for the heat flow W. In this case, the supporting element 4 according to the invention is not restricted to the use of the materials mentioned above, and it is possible to use widely different materials which form a matrix 31, such as polymers, metals, metal alloys, etc. The layers which are embedded in the matrix 31 may also be represented by widely different materials. It is possible to use widely different fiber materials, or else layers composed of a material with thermal conduction characteristics which differ from the matrix. As an alternative to the matrix/layer structure described above, the supporting element 4 may also be formed from a plurality of individual parts 31, which are joined together to form a common component, forming thermal resistances 32.

Figure 4:
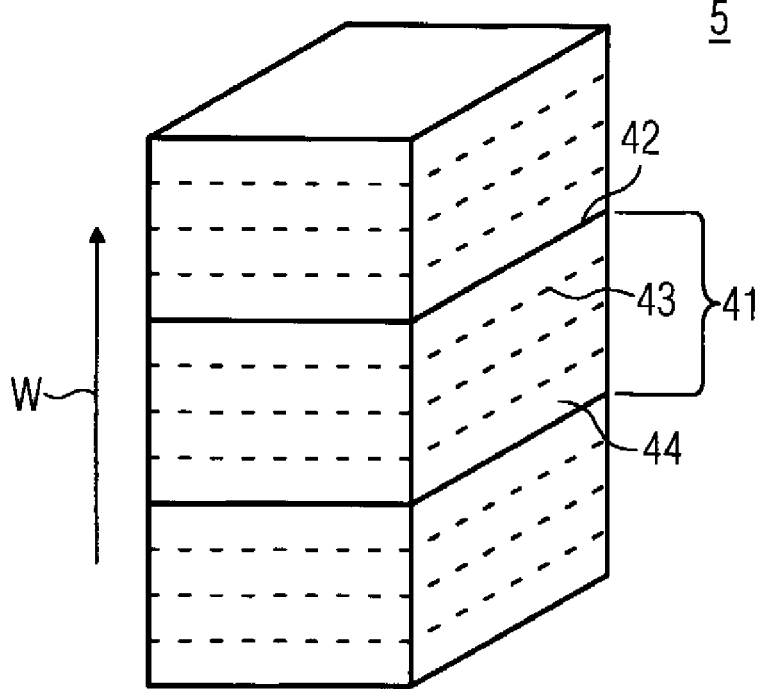

FIG. 4 shows a further embodiment, which is annotated 5 in general, of a supporting element according to the invention. According to this embodiment, the already mentioned concepts for forming thermal resistances are combined with one another. The supporting element 5 comprises a plurality of individual elements 41 which are joined together to form a common component 5, forming macroscopic thermal resistances 42. The individual elements 41 may themselves in turn have a layer structure comprising a matrix 44 and embedded microscopic thermal resistances 43. The total thermal resistance of the supporting element 5 is given by the sum of the individual thermal resistances. Microscopic thermal resistances 43 are formed, for example, by embedded glass-fiber mats. These are located in a poorly thermally conductive matrix 44 composed, for example, of synthetic resin or cast resin. The individual elements 41 are in turn joined together to form a supporting element 5, forming macroscopic thermal resistances 42. This makes it possible to combine the effect of microscopic and macroscopic thermal resistances with one another.

Figure 5:
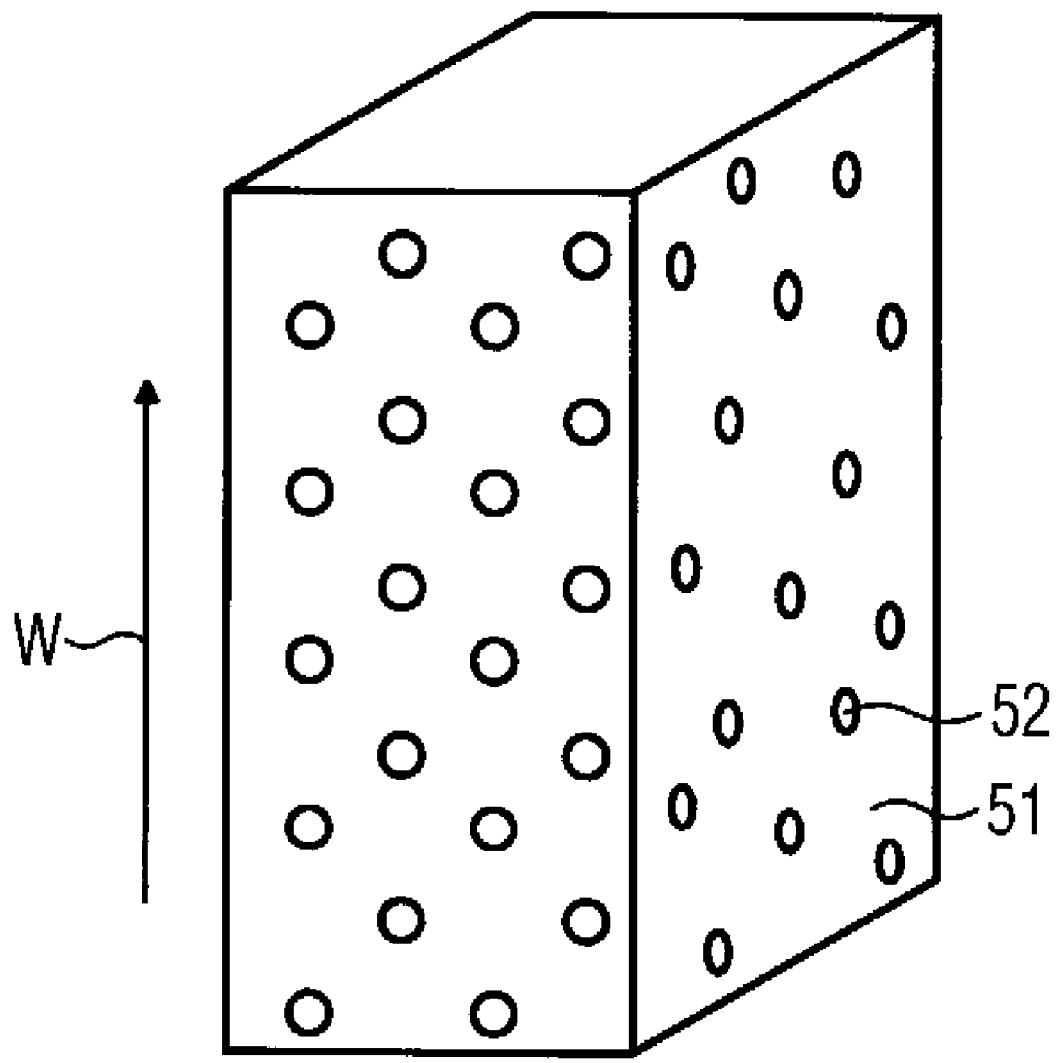

FIG. 5 shows a further preferred embodiment, which is annotated 6 in general, of the supporting apparatus according to the invention. The supporting element 6 is manufactured from a porous material; in particular, poured materials such as Perlite or else sintered materials are suitable for this purpose. The pores 52 which are located in the matrix 51 in this embodiment form the thermal resistances for the heat flow W.

The supporting element may also have a physically greater extent in the preferred direction of heat flow W than in a direction at right angles to the preferred direction of heat flow W. Furthermore, the supporting element may be refined by the choice of its structure and/or of the materials used, such that it can preferably absorb pressure forces.

The supporting element according to the invention may be used in particular in machines with a cooled superconducting rotor winding as part of a holding and/or supporting apparatus for the cold superconducting rotor windings. These machines can be used as motors or generators. The options for use of a machine such as this equipped with superconducting rotor windings extends at least to the known fields of use of comparable machines with normally conductive rotor windings.

What is claimed is:

1. A machine having a rotor with a rotation axis, the rotor comprising:
   an uncooled rotor body having recesses or flats disposed on an outside surface of the rotor body,
   at least one rotor winding arranged in a cross-sectional surface area of the recesses or flats and housed in a cryostat having a cryostat wall, with the at least one rotor winding being cooled to cryogenic temperature, and
   a holding or support device transmitting a force acting on the rotor winding via the cryostat wall to the rotor body, wherein the holding or support device comprises at least one support element transmitting heat in a direction from the rotor body to the rotor winding,
   wherein at least one support element comprises means for reducing thermal conductivity between the rotor body and the rotor winding, said means filling at least a part of a cross-sectional surface oriented perpendicular to the heat transmission direction.

2. The machine of claim 1, wherein the at least one support element is disposed between the rotor winding and the cryostat wall, or between the cryostat wall and the rotor body.

3. The machine of claim 1, wherein the holding and/or support device comprises a plurality of support elements, with at least one of the plurality of support elements disposed between the rotor winding and the cryostat wall and at least one other support element disposed between the cryostat wall and the rotor body.

4. The machine of claim 1, wherein the at least one support element comprises as means for reducing thermal conductivity a layered structure which is oriented essentially perpendicular to the heat transmission direction.

5. The machine of claim 4, wherein the layered structure of the at least one support element is formed from individual parts having contact surfaces, with the individual parts being joined at their respective contact surfaces.

6. The machine of claim 5, wherein the individual parts of the at least one support element are made of glass-fiber-reinforced plastic.

7. The machine of claim 4, wherein the at least one support element is made of glass-fiber-reinforced plastic, and the layer structure of the at least one support element is produced by a corresponding arrangement of glass fibers in the glass-fiber-reinforced plastic.

8. The machine of claim 1, wherein the at least one support element is made from a porous material.

9. The machine of claim 8, wherein the porous material comprises a poured or sintered material.

10. The machine of claim 1, wherein the at least one support element is subjected to a compression force.

11. The machine of claim 1, wherein the at least one rotor winding comprises a superconducting material.

12. The machine of claim 11, wherein the superconducting material is a low-temperature superconducting (LTC) material.

13. The machine of claim 11, wherein the superconducting material is a high-temperature superconducting (HTC) material.

* * * * *